United States Patent [19]

McCall et al.

[11] 4,005,682
[45] Feb. 1, 1977

[54] ROTARY INTERNAL COMBUSTION ENGINE

[76] Inventors: William B. McCall, 1447 E. Town and Country Lane; William J. Harper, 417 E. Echo Lane; William P. Harper, 311 E. Orchid Lane, all of Phoenix, Ariz. 85020

[22] Filed: May 8, 1975

[21] Appl. No.: 575,491

[52] U.S. Cl. .............................. 123/8.19; 416/179; 418/183; 418/188; 418/195
[51] Int. Cl.² ......................................... F02B 53/08
[58] Field of Search ................. 418/183, 188, 195; 416/179, 182, 185, 92, 123; 123/8.19

[56] References Cited

UNITED STATES PATENTS

| 1,949,723 | 3/1934  | Kotelevtseff | 418/183 |
| 2,058,817 | 10/1936 | Northey      | 418/183 |
| 2,276,404 | 3/1942  | Lundquist    | 416/179 |
| 2,366,213 | 1/1945  | Pover        | 418/183 |
| 3,362,338 | 1/1968  | Stethem      | 416/179 |
| 3,431,728 | 3/1969  | Bezimensky   | 416/179 |
| 3,514,239 | 5/1970  | Hambric      | 418/195 |
| 3,523,003 | 8/1970  | Hambric      | 418/195 |
| 3,751,193 | 8/1973  | McCall       | 418/195 |

*Primary Examiner*—C. J. Husar

[57] ABSTRACT

The disclosure relates to a rotary machine, the basic elements of which are generically adapted for use as a two-stage pneumatic compressor or as a four-cycle combustion engine or as a two-cycle combustion engine. The basic combination of elements of the machine comprises a plurality of rotors rotatably mounted on axes disposed at substantially right angles to each other and wherein the rotors are provided with peripheral portions having inwardly notched or recessed chamber portions which are disposed between alternate radially extending lobe portions. The lobe portion of each rotor adapted to pass into a respective recess chamber portion of another rotor in an intersecting area and means is provided to rotate the rotors in timed relationship with each other; each rotor having a central air compressor inlet disposed near its respective rotary axis and having outwardly directed centrifugal compressor blade means extending from the generally central inlet to the peripheral portions of the respective lobes at which each lobe is provided with a compressor outlet; a housing for said rotors comprising an air receiving plenum communicating with the periphery of each rotor for receiving compressed air from the outlets of said centrifugal compressor outlets of the lobes; each plenum extending an arcuate distance sufficient to provide for supercharging of each of said recess chamber portions as they pass the respective air receiving plenum in the housing. The disclosure also relating to specific details of the foregoing combination of elements as they relate to four-cycle combustion engines; two-cycle combustion engines and two-stage compressors, all of which combine centrifugal air compression with second stage positive compression and further the disclosure relates to regenerative heat exchange or intercooling respectively related to the combustion engine species and the compressor species.

16 Claims, 18 Drawing Figures

ROTARY INTERNAL COMBUSTION ENGINE

PRIOR ART

The following prior art is hereby made of record relative to the subject matter disclosed in this application.

| | |
|---|---|
| W. B. McCall | 2,674,982 |
| W. B. McCall | 3,060,910 |
| J. C. Hambric | 3,502,054 |
| James C. Hambric | 3,524,435 |
| James C. Hambric | 3,563,213 |

BACKGROUND OF THE INVENTION

The prior art patents enumerated above disclose engines or rotary machines which are of a type, by way of example, those machines having two or more intersecting rotors.

As disclosed in such patents, the piston faces exposed to the combustion gases of the power stroke are subjected to heat for the full length of the power stroke. By way of contrast, the inner hub surfaces of the rotor cavity of such engines is exposed to the heat of combustion for a varying length of time along its surface, i.e., a longer period of time near the piston face diminishing to a short period of time near the trailing face of the cavity, and the trailing face of the cavity is scarcely exposed to the heat of combustion as the exhaust cycle has started at about the time the trailing face is exposed to the combustion gases of the power stroke. In addition to the unequal distribution of heat above described on the rotor performing a power stroke, the adjacent rotor, the side surface of which is used as a reactive surface of the first rotor power stroke and then is subjected to the heating of combustion on one side surface only. Concurrently, the opposite side of the same lobe of that respective rotor is subjected to the heat of compression for the next following power cycle. Thus one side of each lobe of each rotor is exposed to the heat of combustion while the other side of the same lobe is concurrently exposed to the heat of a compression stroke at a much lower level.

It is thus apparent that in the cycling of the engine through intake, compression, combustion and exhaust, that various surfaces of the interacting rotors are subjected to wide extremes of temperature at any given point in time.

In addition, while the outer housing, block, or stator of this engine may be cooled by the various conventional means disclosed in the foregoing patents, such as means comprising cored passages for liquid cooling, or heat radiating fins cooled by the passage of air over them to reject heat, the rotors of the prior art engines are not subject to cooling in the same sense that is accomplished in a conventional reciprocating piston engine by conduction, either direct or through oil films to the housing walls.

One of the desirable features of the prior art engines is that lubricating oil is not exposed to the through flow or power cycle of the engine, or in the compressor species as the case may be.

It is possible to cool the rotors of such prior art machines by circulating a coolant liquid through rotating seals and the shafting of the rotors and through the passageways in the interiors of the rotors and thus reject heat to the ambient surrounding area as in the case of the housing functioning as casing cooling. However, this is undesirable from the standpoint of engine efficiency and fuel economy. Heat thus rejected is lost to the cycle or the net shaft power generated by the engine for a given amount of fuel.

It will be appreciated that the prior art as represented by the foregoing patents includes engines which are basically normally aspirated engines wherein the evacuation of the rotor chambers causes a negative pressure which induces air to flow into the rotor chambers but which does not provide for supercharging of such engines. It being understood, however, that a shaft driven compressor externally of such prior art engines might be used to provide for supercharging of the rotor chambers thereof such as has been used in connection with many piston engines.

SUMMARY OF THE INVENTION

The present invention relates generally to a rotary machine of the general type disclosed in the foregoing patents listed as prior art; the rotary machine of the present invention comprising intersecting rotors rotating at angles to each other and having alternate intersecting lobes and recess chamber portions in which the lobes rotatably pass.

The present invention is related to improvements in rotary machines of this type, such improvements being related to four-cycle combustion engines; two-cycle combustion engines and/or pneumatic compressors.

This invention comprises improvements adapted to fulfill the requirements of a discretely distributed coolant flow of air or fluid mixture through the interior surfaces of combustion engine rotors of the type generally hereinbefore disclosed. Such distribution of coolant flow being capable of affecting a heat transfer from the rotor surfaces in such a manner that the extremes of temperature are balanced toward a uniform normal temperature of the rotor as a whole and to return the heat rejected from the rotor surfaces to the engine power cycle rather than rejecting it as waste heat to the surrounding ambient atmosphere.

Concurrently, and as part of the foregoing accomplishment, it is a characteristic of the configuration of the present rotors that when rotating at substantial speed they produce centrifugal pumping action of air or a fuel air mixture which is admitted through a central compressor inlet of each rotor and discharged through outwardly directed compressor rotor vanes internally of each radially disposed lobe of the rotor to outlets of each lobe at the periphery of the rotor. Thus a centrifugal compressor is incorporated in the interior of each rotor of the machine of the invention and, accordingly, air passing through the hollow interior of the rotor in the centrifugal compressor area structure thereof tends to provide more uniform thermal conditions throughout the structural features of each rotor and as hereinbefore described, the heat exchanged from the rotor as a result of combustion activities in connection therewith is carried into a compressed air receiving plenum in the housing at the periphery of each rotor which communicates with the centrifugal compressor outlets at the peripheries of the lobes of each rotor.

In the case of one species of the rotary machine of the invention, a fuel air mixture may be introduced through the centrifugal compressor of each of the aforementioned rotors in such a manner that the fluid enters the centrifugal compressor structure near the axis of rotation of each rotor and progresses generally in a radial direction between the compressor blading, fins or webs as may be the configuration of the centrifugal compressor such that heat transfer surfaces are exposed to the fluid or gas flow to discretely cool and balance the rotor surface temperatures in the manner hereinbefore described for lengthening material life of the rotors and for other thermal considerations hereinbefore described.

In addition, the rotors in their centrifugal compressor areas may be of such configuration so as to provide vanes or passageways which serve as heat transfer surfaces to promote the radial flow of gases so as to discharge the flow from the outer periphery of the lobes of the rotors into a suitable cavity or plenum in the housing or rotary machine casing.

This cavity being extended in an arcuate direction in the housing so as to provide an intake or supply plenum for the recessed chamber or combustion chamber areas so that such compressed air or fuel supplies may pass into the recess chambers for subsequent compression in such chambers either to function as a means for compressing air or a fuel mixture for combustion depending upon the species of the invention to which this structure of the invention applies.

In this manner, as in the combustion engine species, the incoming air or fuel air flow cools the rotor and at the same time recovers what might have been waste heat to the engine cycle. This heat is thus introduced into the next intake recess chamber for subsequent compression and combustion.

Also the air or fuel air gas mixture having been subject to centrifugal pumping action has in effect performed a supercharging or an effective increased pressure level into the air receiving plenum in the chamber so as to charge the rotor chambers of the engine preliminary to the following compression stroke and the density of such charges in the recess chambers depends upon rotor speeds and interior rotor configuration as to the degree or intensity of the charge, particularly as it may be measured in pounds per square inch of pressure.

It will be understood that the invention when in the combustion engine species provides a means to perform required rotor cooling as well as to recover heat dissipated in the rotor and the housing of the engine for return to the engine power cycle without having to reject such heat as waste heat to the benefit of specific fuel consumption and thus the present engine also concurrently accomplishes supercharging of the incoming air or fuel air mixture with the resulting improvement of the volumetric efficiency of the engine.

It will be understood that the magnitude of the foregoing benefits may vary with the particular design parameters related to size, speed, and design point variances of any given combustion engine.

It is obvious that the present invention and improvements thereof will enhance any engine or rotary machine of the type hereinbefore disclosed by the listed prior art and such prior art engines would benefit by one or more of the three functions hereinbefore described which the improvements of the invention provide in performance as hereinbefore described.

Accordingly, it is an object of the present invention to provide several improvements over the listed prior art including regenerative heat exchange for fuel conservation and efficiency, supercharging for volumetric efficiency, rotor cooling to provide for durability as well as reduction in thermal stresses within the rotors of the machine of the invention so as to provide for longevity thereof.

Another object of the invention is to provide an improved rotary machine of the general concept of the listed prior art which includes cooperative rotors having alternate notch portions and projections which intermesh at their projections and notch portions in a controlled rotational relationship provided by means for synchronizing rotation thereof and wherein centrifugal compressor means internally of each rotor provides centrifugal compression of compressible fluid and delivers it into the housing of the machine wherein it is introduced into positive displacement recesses or chambers between the lobes or projections and wherein the compressible fluid is positively compressed at an area of intersection of the rotors so as to provide a two-stage compressor effect involving a centrifugal first stage and a positive displacement second stage.

Another object of the invention is to provide a machine of the type disclosed herein which may operate at very high speed and wherein a first stage of pneumatic fluid compression is accomplished centrifugally and the fluids so compressed are introduced into a positive displacement compressor mechanism which finally positively compresses the fluids to a higher pressure.

Another object of the invention is to provide a machine of the type disclosed herein wherein the basic combination of rotors which intersect each other include centrifugal compressor mechanisms which are common to either a two-stage compressor, a two-cycle combustion engine or a four-cycle combustion engine.

Another object of the invention is to provide novel heat exchange means for engines of the class described herein involving heat exchange through compressor blades internally of the rotors of the machine and also from fins of the rotor housings as the air enters from the atmosphere to the inlet of the centrifugal compressors internally of the rotors.

Another object of the invention is to provide a machine of the class described wherein a species thereof involves two-stage compression of compressible fluid and wherein intercooling may be conveniently provided by heat exchange means of the housing which contains the intermeshing synchronously operated rotors of the invention.

Another object of the invention is to provide a high speed rotary machine which may operate very efficiently as a pneumatic compressor, a two-cycle combustion engine or four-cycle combustion engine.

Further objects and advantages of the present invention may be apparent from the following specification, appended claims and accompanying drawings.

DESCRIPTION OF THE PREFERRED EMBODIMENTS

Figure 1:
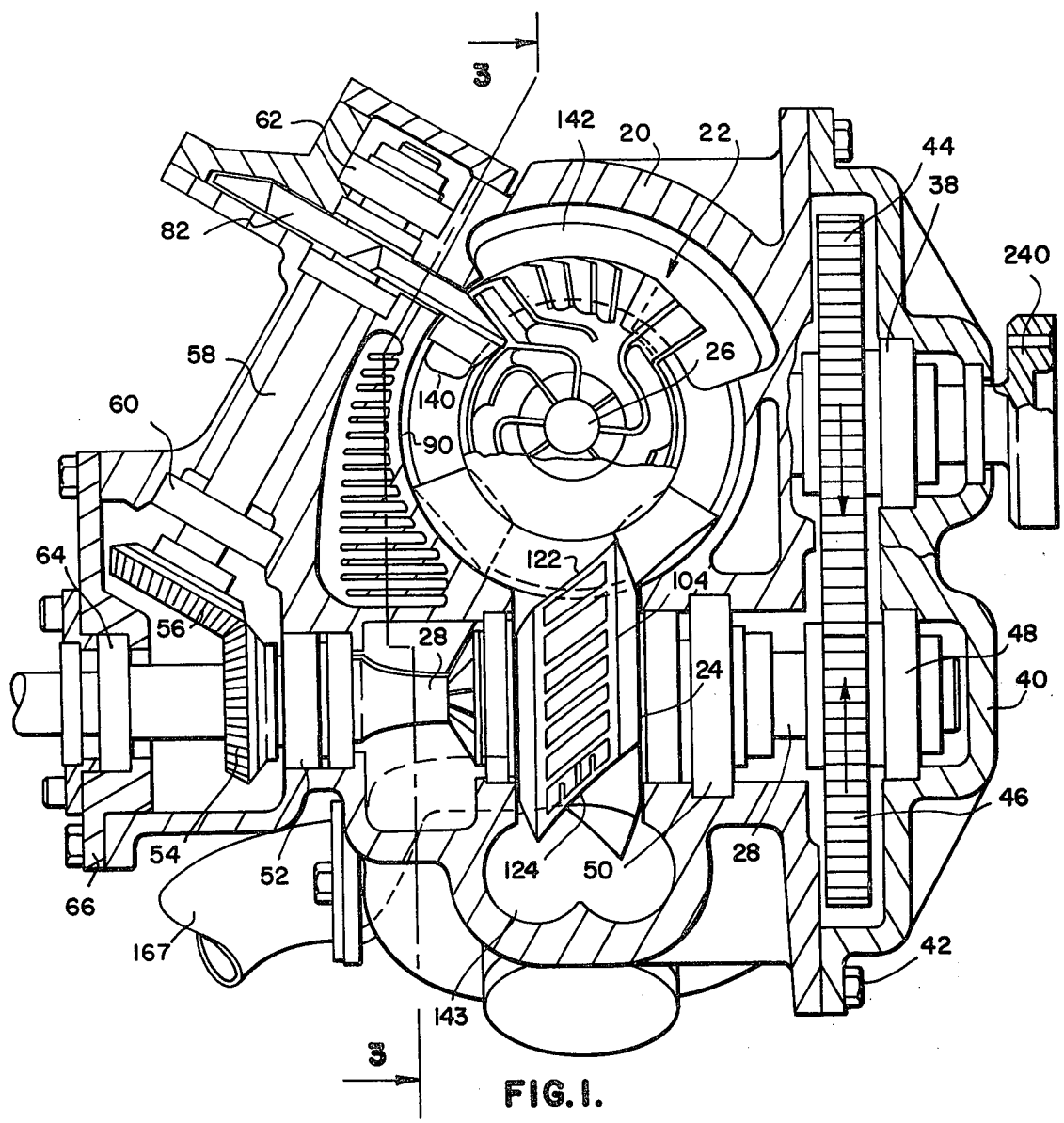
FIG. 1 is a sectional view of a four-cycle engine species of the rotary machine of the invention showing parts and portions in elevation and further broken away beyond the plane of the section to amplify the illustration.
Figure 3:
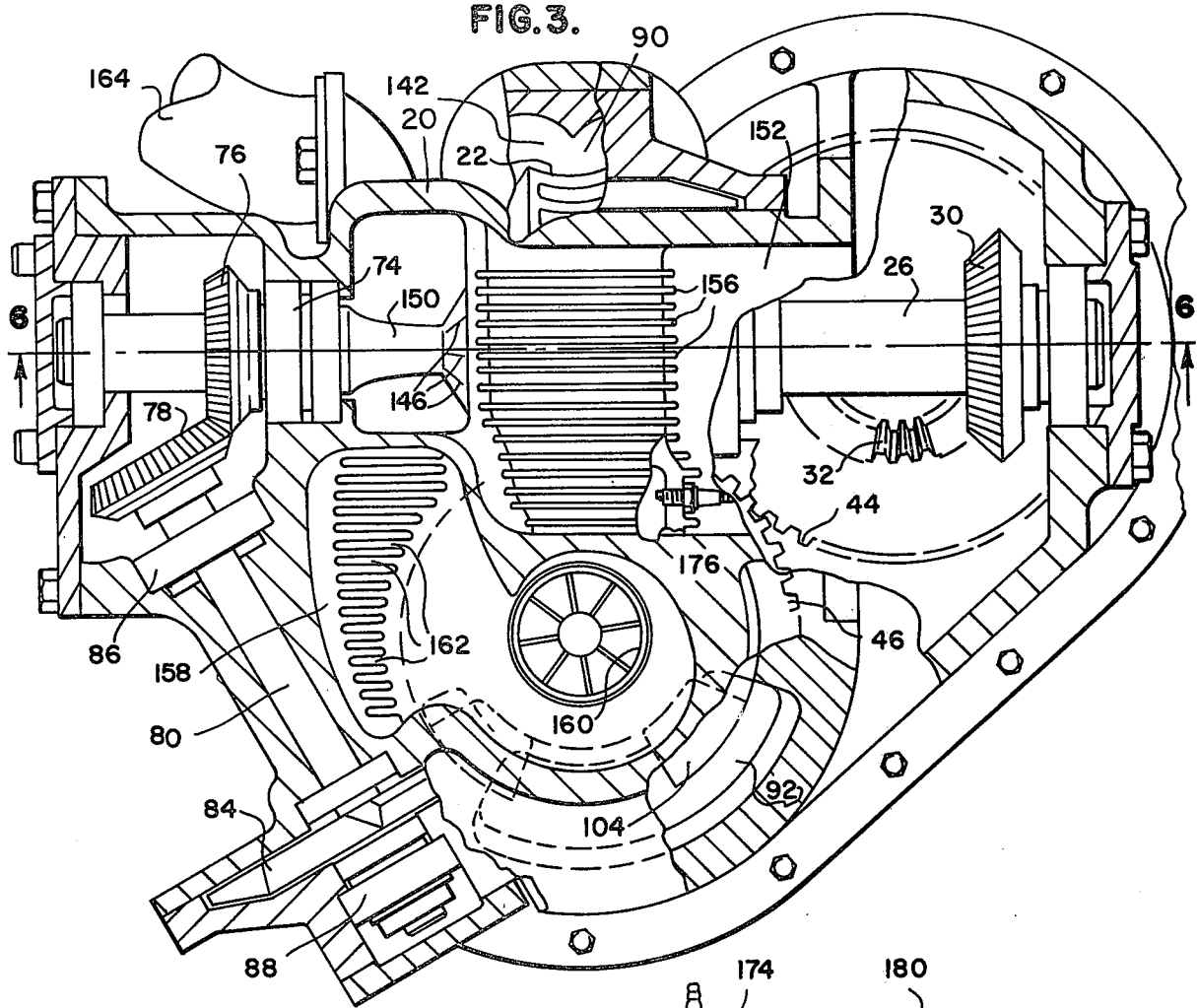
FIG. 3 is a sectional view taken from the line 3—3 of FIG. 1 showing parts and portions in elevation and showing portions broken away and displaced from the plane of the section of section line 3—3 in FIG. 1.
Figure 6:
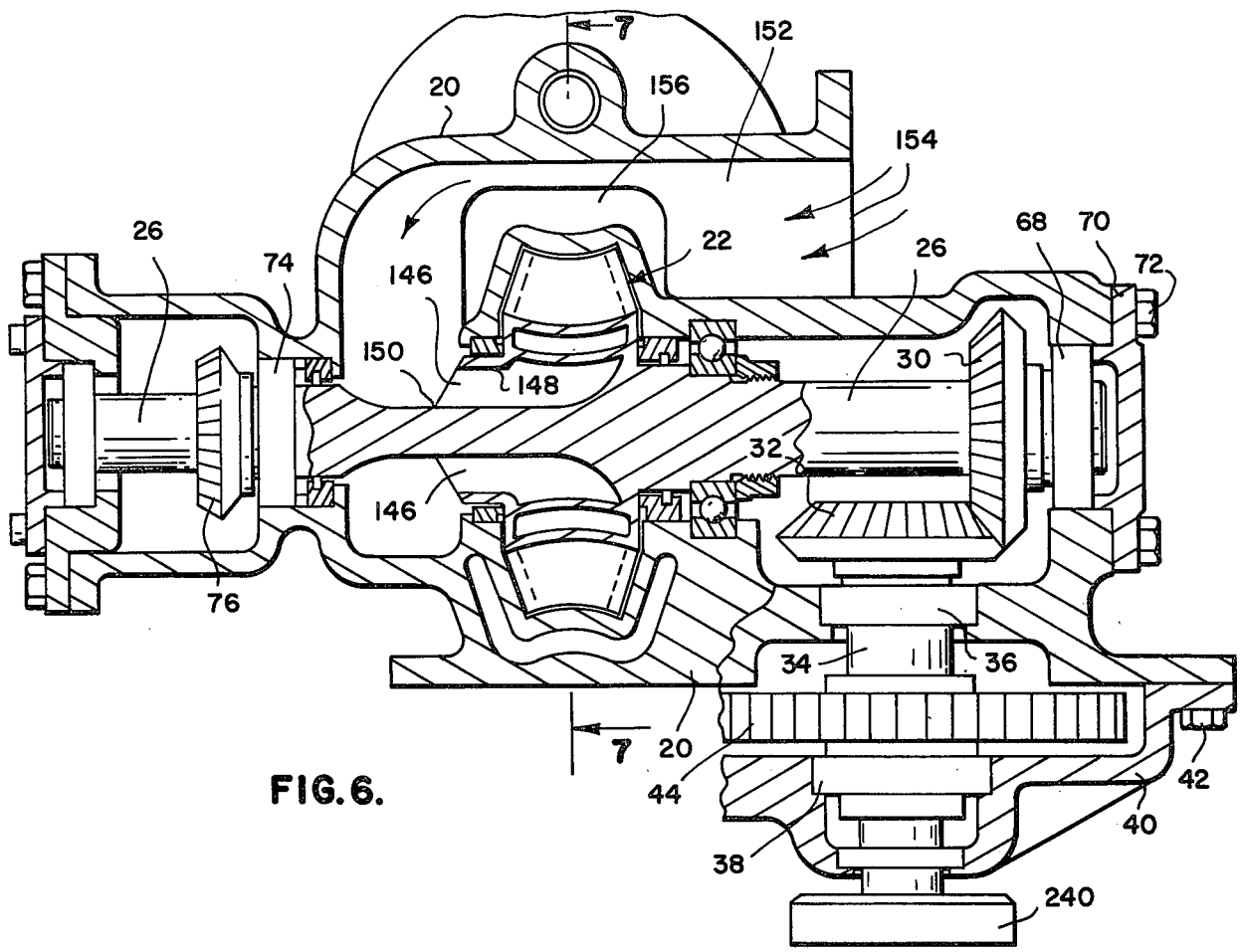
FIG. 6 is a sectional view taken from the line 6—6 of FIG. 3.

As shown in FIGS. 1, 3 and 6 of the drawings, a four-cycle combustion engine specie of the invention is provided with a housing 20 wherein rotors 22 and 24 are rotatably mounted; these rotors 22 and 24 are rotatably mounted on respective shafts 26 and 28 which are offset relative to each other and disposed at right angles to each other. The axis of the respective rotors 22 and 24 are concentric with the shafts 26 and 28.

Fixed to the shaft 26 as shown in FIG. 6 and FIG. 3 of the drawings is a miter gear 30 which meshes with another miter gear 32 carried by a shaft 34 mounted in the housing 20 by means of bearings 36 and 38. The bearing 38 supported in a bearing cap 40 coupled to the housing by bolts 42.

Also fixed on the shaft 34, as shown in FIG. 1, is a spur gear 44 which meshes with a spur gear 46. The spur gear 46 being fixed to the rotor shaft 28.

One end of the shaft 28 is carried by a bearing 48 in the bearing cap 40 while another bearing 50 on the shaft 28 is disposed at one side of the rotor 24. Additionally, a bearing 52 is disposed in the housing to support the shaft 28 and adjacent to this bearing a miter gear 54 is fixed to the shaft 28 and this miter gear meshes with another miter gear 56 which drives an abutment rotating shaft 58 rotatably mounted in bearings 60 and 62 in the housing 20.

An outboard end of the shaft 28 beyond the miter gear 54 is carried in a bearing 64 and a bearing cap 66 supports this bearing 64 in the housing 20.

As shown specifically in FIG. 3 of the drawings, the miter gear 30 on the shaft 26 is adjacent to a bearing 68 which is mounted in the housing 20 and held axially by a bearing cap 70 fixed to the housing by bolts 72.

Thus the shaft 26 is rotatably mounted and the bearing 68 holding the miter gear 30 in proper meshed relationship with the miter gear 32, these gears being held precisely so as to attain minimum backlash in the operation of the gear train which synchronizes rotary operation of the rotors 22 and 24 relative to each other as will be hereinafter described.

As shown in FIGS. 3 and 6 of the drawings, the shaft 26 supports the rotor 22 which is integral therewith, however, the rotor may be otherwise secured to or carried by the shaft 26 as desired.

The shaft 26 is also supported in a bearing 74 adjacent to which a miter gear 76 is fixed to the shaft 26. This miter gear 76 as shown in FIG. 3 of the drawings meshes with another miter gear 78 fixed to a second abutment operating shaft 80 and this shaft 80 is similar to the shaft 58 hereinbefore described. These shafts 58 and 80 carry respective abutment rotors 82 and 84 which are generally shaped similar to the rotors 22 and 24 as will be hereinafter described.

The abutment member 82 being adapted to cooperate with the rotor 22 while the abutment 84 is adapted to cooperate with the rotor 24.

As shown in FIG. 3, the shaft 80 is rotatably mounted in bearings 86 and 88.

Figure 2:
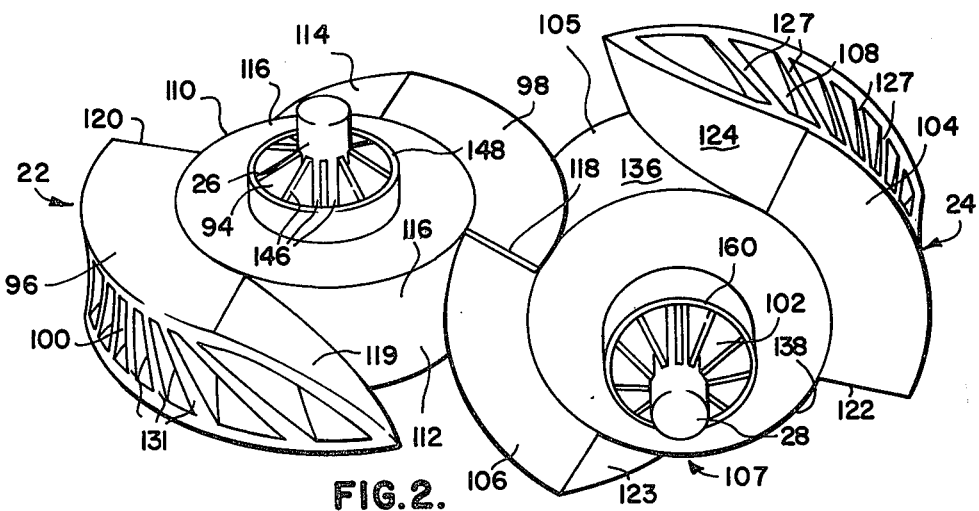
FIG. 2 is a perspective view of a pair of rotors of the invention shown with their shafts fragmentarily and showing a rotating relationship of said rotors.

The rotors 22 and 24 are rotatable in generally circular cavities 90 and 92 respectively of the housing 20 and a functional relationship of these rotors 22 and 24 is shown in FIG. 2 of the drawings wherein a centrifugal compressor inlet 94 of the rotor 22 is shown near the axis of rotation which is at the center of the respective shaft 26. This rotor 22 being provided with a pair of lobes 96 and 98 which are substantially identical. The lobe 96 having at its periphery a compressor outlet 100 and the lobe 98 having a similar compressor outlet, both of the compressor outlets communicating with the interior of the rotor with which the compressor inlet 94 communicates. Likewise the rotor 24 is provided with a central compressor inlet 102 similar to the inlet 94 of the rotor 22 and lobes 104 and 106 of the rotor 24 are similar to the lobes 96 and 98 of the rotor 22. These lobes 106 and 104 are provided with compressor outlet portions 108 at the respective peripheries of the lobes 104 and 106.

Disposed between the lobes 98 and 100 of the rotor 22 are recess chamber portions 110 and 112. These recess chamber portions 110 and 112 are disposed between the lobes 96 and 98 and the lobe 98 is provided with a leading wall surface 114 which extends radially outward from a respective hub surface 116. The lobe 98 is also provided with a trailing wall surface 118 communicating with the recess chamber 112. The lobe 96 is provided with a leading chamber surface 119 which is disposed in a generally radial direction from the axis of the shaft 26 and a corresponding trailing surface 120 of the lobe 96 forms a substantially radially extending wall of the recess chamber 110.

The lobe 104 of the rotor 24 is provided with a leading chamber wall surface 122 and a trailing wall surface 124, these surfaces being shown in FIG. 1 of the drawings, wherein it will be seen that these leading and trailing surfaces of the lobe 104 are substantially parallel and are both disposed on a substantially helical angle relative to the rotary axis of the shaft 18. Accordingly, the construction of both the rotors 22 and 24 is substantially identical.

Figures 8, 9:
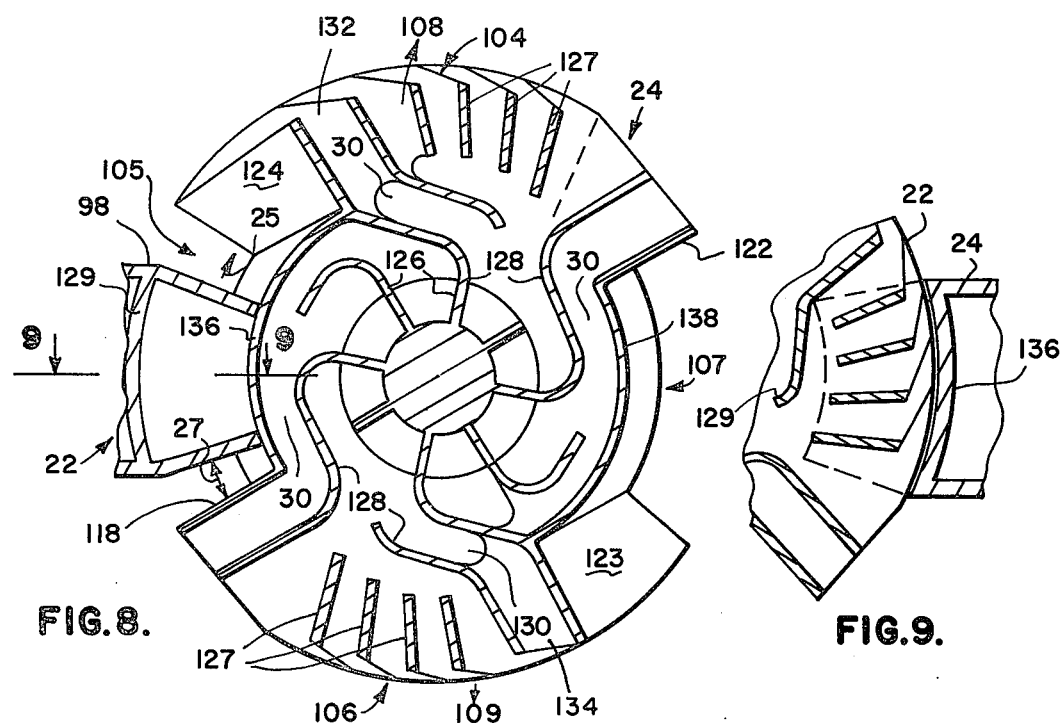
FIG. 8 is a view similar to FIG. 7 but showing the rotor rotated substantially 90° from that shown in FIG. 7 and showing a fragmentary sectional portion of the complemental rotor of the machine intersecting the rotor shown in FIG. 8.
FIG. 9 is a fragmentary sectional view taken from the line 9—9 of FIG. 8.

With reference to FIG. 8, it will be seen that this Figure is a sectional view through the interior of the rotor 24 transversely of its axis. The rotor 24, as hereinbefore described, is of a configuration having two lobes 104 and 106 and two intermediate recess chambers 105 and 107. The lobes 104 and 106 may be considered to be pistons of the engine disclosed in FIG. 1 of the drawings. The adjacent intermeshing rotor 22 is shown in a typical position where the rotor 24 is operating in a power stroke as represented by the arrow 25 and that this power stroke 25 is partially completed and a compression stroke as indicated by the arrow 27 is occurring at the same time within the recess cavity 105. It will be seen that the force of the power stroke is exerted on the face 124 of the cavity 105 and that compression of the fresh fuel charge is occurring against the face 118 of the chamber recess 105. It will be understood that the combustion gases in the power stroke area 25 are relatively hot as compared to the fuel charge being compressed as indicated by arrow 27.

The incoming fuel charge which enters the compressor inlet of the rotor 24 is conducted through an inlet passage as will be hereinafter described and may be carbureted or fuel injection may be utilied as desired to proportion the fuel such as hydrocarbon fuel relative to the air pumped through the compressor inlet 102.

The air entering the compressor inlet 102 near the axis of rotation of the shaft 28 flows radially outward as a result of centrifugal action imparted by blades 126 and 127 and the air is distributed discretely through various areas of the lobes 104 and 106 by means of the ribs 128 and passageways 130 disposed in the interior of the rotor 24 to direct the flow for cooling and pumping air for the desired purposes. In the areas of higher temperatures additional fins 132 and ribs 134 may be utilized for required heat transfer surface areas.

It will be seen that the rotor 24 is provided with an arcuate hub portion 136 in the bottom of the recess cavity 105 and that this hub portion 136 is arcuate and that the respective end of the lobe of the rotor 22 is concave and generally conforming with the convex surface of the hub portion 136. Likewise the recess cavity 107 is provided with an arcuate hub portion 138 similar to the arcuate hub portion 136.

As shown in FIG. 9 of the drawings, the arcuate hub portion 136 is laterally concave and generally conforms to the periphery of the respective lobes of the rotor 22. It will be seen that the rotor 22 is provided with ribs 129 similar to the ribs 128 of the rotor 24. The function of the centrifugal compressor internally of each rotor and the vanes and blades hereinbefore described provides for distribution of flow which may be proportional to attain desired thermal levels for the various areas of the rotors in accordance with design and analysis of the required heat transfer areas. The centrifugal compressor action on the incoming intake charge will more than offset the volumetric efficiency loss to the engine that would normally be experienced by subjecting the incoming charge to heating without the benefits of supercharging.

Figure 7:
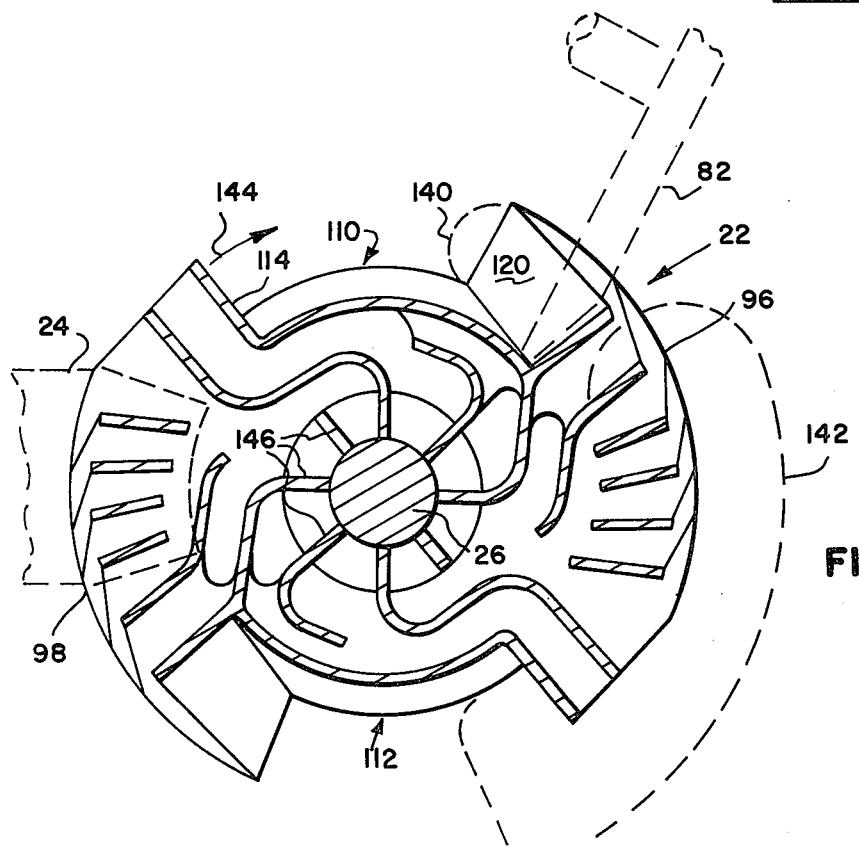
FIG. 7 is an enlarged sectional view taken from line 7—7 of FIG. 6 showing the internal centrifugal compressor structure of one of the rotors of the invention and showing by a broken line the relationship of an exhaust abutment mechanism as well as the related complemental rotor and also the air receiving plenum associated with the respective rotor shown in FIG. 7.

As shown in FIG. 7, the engine housing is disclosed diagrammatically and the position of the rotor 22 is typical of either of the rotors after immediately finishing a power stroke and a position wherein the exhaust stroke is being initiated. The exhaust port 140 in the engine housing 20 is located on one or both sides of the rotor 22. The rotary abutment 82 acts as a scavenging rotor and is rotated into the rotor recess chamber 110 to positively displace burned combustion gases from the cavity 110 outward through the exhaust port 140 and the evacuated cavity 110 is rotating to pass through an intake cavity 142 in the housing 20. This cavity 142 is shown in FIG. 1 of the drawings and is a generally arcuate cavity extending outward from the periphery of the rotor 22 and is of the same cross sectional configuration as another cavity 143 which is disposed adjacent the periphery of the rotor 24, all as shown in FIG. 1 of the drawings. It will be seen that the cross section of the cavity 143 which corresponds with the cross sectional shape of the cavity 142 is disposed in communication with the opposite sides of the respective rotors.

These cavities 142 and 143 are air receiving plenums adapted to receive compressed air of a compressed fuel charge from the respective rotors so that when each rotor, such as the rotor 22 shown in FIG. 7, passes in the direction as indicated by an arrow 144, the cavity 110 passes into communication with the air receiving plenum 142 and is thus charged with air previously compressed by centrifugal delivery of air through the centrifugal compressor section of the interior of each rotor lobe and as shown in FIG. 7 of the drawings, the lobe 96 is in a position wherein it is delivering compressed air or fuel air mixture into the receiving plenum 142 so that when the cavity 110 rotates in the direction of the arrow 144, the compressed air or fuel air mixture charges the cavity 110 and this charge in the cavity 110 is subsequently compressed adjacent to a respective lobe of the rotor 24 as will be hereinafter described in detail.

Accordingly, the air or the air fuel mixture discharged from the periphery and compressor outlet of the lobe 96 by centrifugal pumping action into the receiving plenum 142 and flows into the then evacuated cavity 110 for compression in the continuing engine cycle as hereinbefore described.

The flow imparted by the centrifugal compressor in the rotor charges the receiving plenum 142 with pneumatic pressure higher than ambient pressure and, as hereinbefore described, the plenum 142 communicates with opposite sides of the cavity 110 for rapidly charging it from the sides as well as at the periphery of the rotor 22 as it rotates through the plenum 142, and, accordingly, such disposition and geometry of the plenum 142 contributes to volumetric efficiency.

It may be noted that the discharge of the lobe 96 is conveniently used to fill the evacuated cavity 110 immediately following and in the direction of rotation. The end of the plenum 142 in the direction of rotation is such that full housing enclosure is provided at the sides and periphery of the rotor 22 before intermeshing of the cooperating lobe of the rotor 24 has started to affect compression of the fresh fuel charge in the recess chamber 110.

It will be understood that the arcuate length of the receiving plenum 142 is substantially equal to or slightly greater than the arcuate length of the respective rotor lobes such as the rotor lobes 96 and 98 shown in FIG. 7 of the drawings.

With reference to FIG. 6 and 7 of the drawings, it will be seen that the rotor 22 is integral with the shaft 26, however, it may be secured thereto in any suitable manner as desired.

The rotor 22 is substantially identical with the rotor 24 previously described and the centrifugal compressor blading and vanes are similar such that the rotor 22 is provided with vanes 146 which are similar to the vanes 126 of the rotor 24. These vanes 146 are shown in FIG. 6 of the drawings and are surrounded by a substantially cylindrical compressor inlet eye 148 and diameter section 150 of the shaft 26 and the internal compressor structure of this rotor 22 being similar to the details of the rotor 24 disclosed in FIG. 8 provide for the same centrifugal pumping action which has been hereinbefore described and which provides for the delivery of compressed air into the air receiving plenum 142. The rotor 24 being adapted to deliver compressed air into the plenum 143 as shown in FIG. 1 of the drawings.

It will be seen in FIG. 6 of the drawings that the housing 20 is provided with an inlet passage 152 adapted to receive air as indicated by arrows 154. The air may be mixed with hydrocarbon fuels or otherwise to provide a fuel mixture or fuel injection may be accomplished in the combustion chambers as will be hereinafter described in connection with FIGS. 4 and 5 of the drawings.

Referring to FIG. 6, it will be seen that the passage 152 is provided with projecting fins 156 which project from the combustion chamber areas of the housing adjacent the periphery of the rotor 22 and that these fins 156 also shown in FIG. 3 of the drawings are adapted to exchange heat to the air moving through the intake passage 152. Thus the air passing through the intake passage 152 collects heat from the surfaces of the fins 156 and the air passes into the inlet eye 148 of the centrifugal compressor portion of the rotor 22 carrying heat which would otherwise be lost without use of heat exchange to the incoming air through the passage 152.

A passage similar to the passage 152 is designated 158 in FIG. 3 of the drawings and this passage 158 communicates with an inlet eye 160 of the rotor 24. Heat exchange fins 162 in the passage 158 exchange heat to the air or fuel mixture entering the compressor inlet eye 160 of the rotor 24.

The configuration of the inlet passage 158 is similar to that of the inlet passage 152 as shown in FIG. 6 of the drawings.

The hereinbefore described exhaust port 140, shown by broken lines in FIG. 7 of the drawings, is also shown in solid lines in FIG. 1 of the drawings, and this outlet exhaust port 140 communicates with an exhaust pipe 164 as shown best in FIG. 3 of the drawings which carries exhaust products to the atmosphere. A similar exhaust pipe 167 communicates with a port adjacent to the rotor 24 and this port is similar to the port 140 hereinbefore described.

Figure 4:
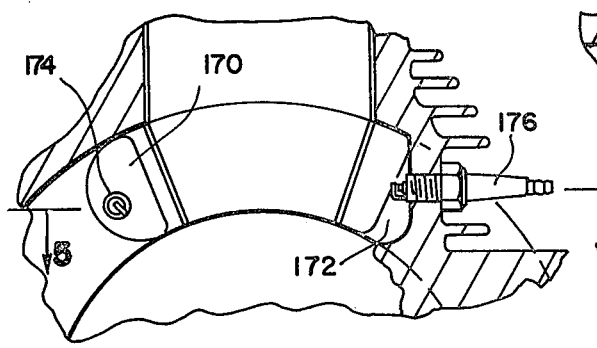
FIG. 4 is an enlarged fragmentary sectional view of the combustion chamber area of the machine as shown in FIG. 3 and showing the section on substantially the same plane as the broken away combustion chamber section disclosed in FIG. 3.
Figure 5:
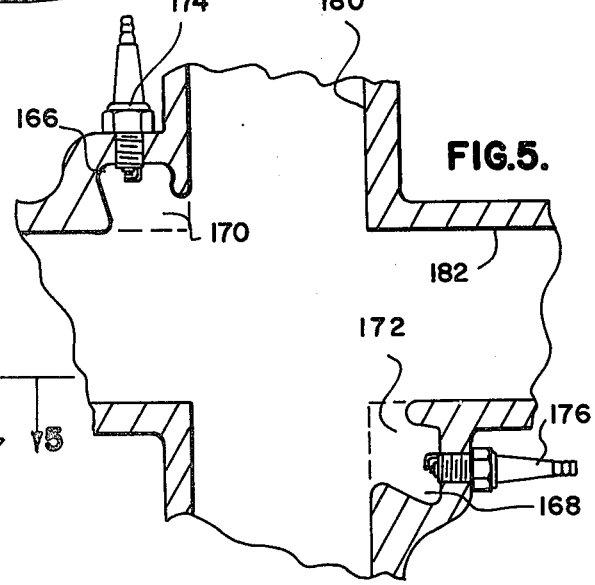
FIG. 5 is a fragmentary sectional view taken from line 5—5 of FIG. 4.

As shown in FIG. 4 and 5 of the drawings, combustion chambers 166 and 168 are disposed in the housing at intersection areas 170 and 172 of the rotors 22 and 24 and these combustion chambers are provided with respective spark plugs 174 and 176. Fuel injection nozzles may also be located in these combustion chambers in engines using this mode of fuel intake.

Figure 15:
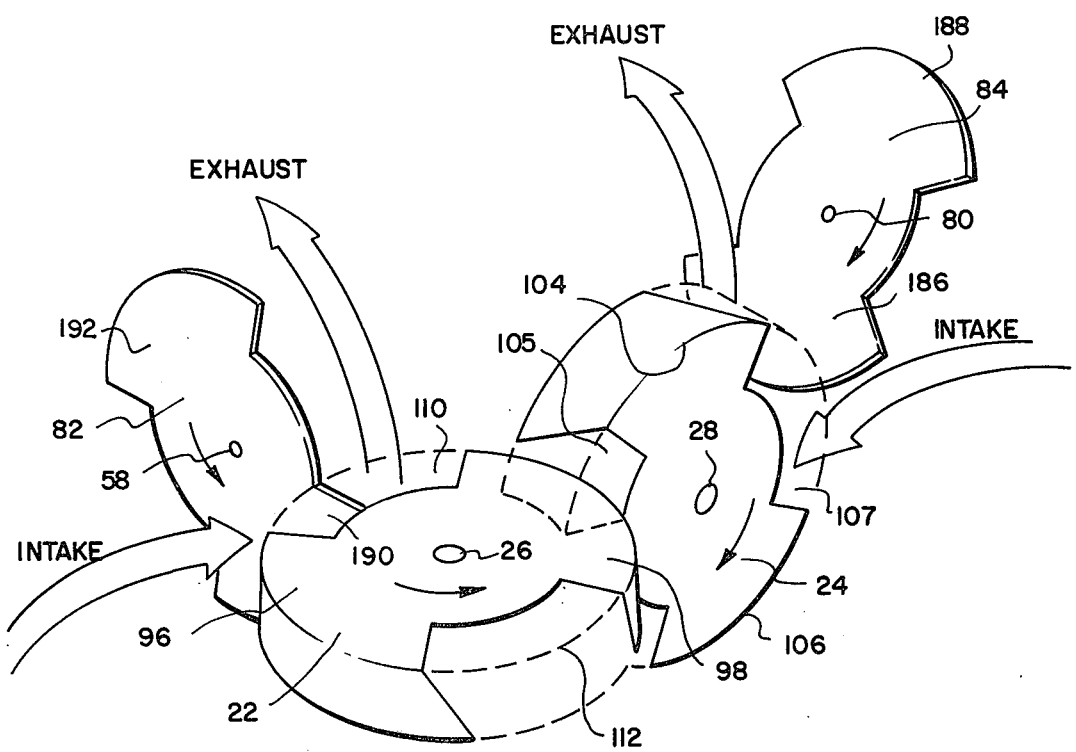
FIG. 15 is a diagrammatic view showing the basic elements and mode of operation of the four-cycle specie of the rotary machine of the invention in one position of the rotary cycle thereof.
Figure 16:
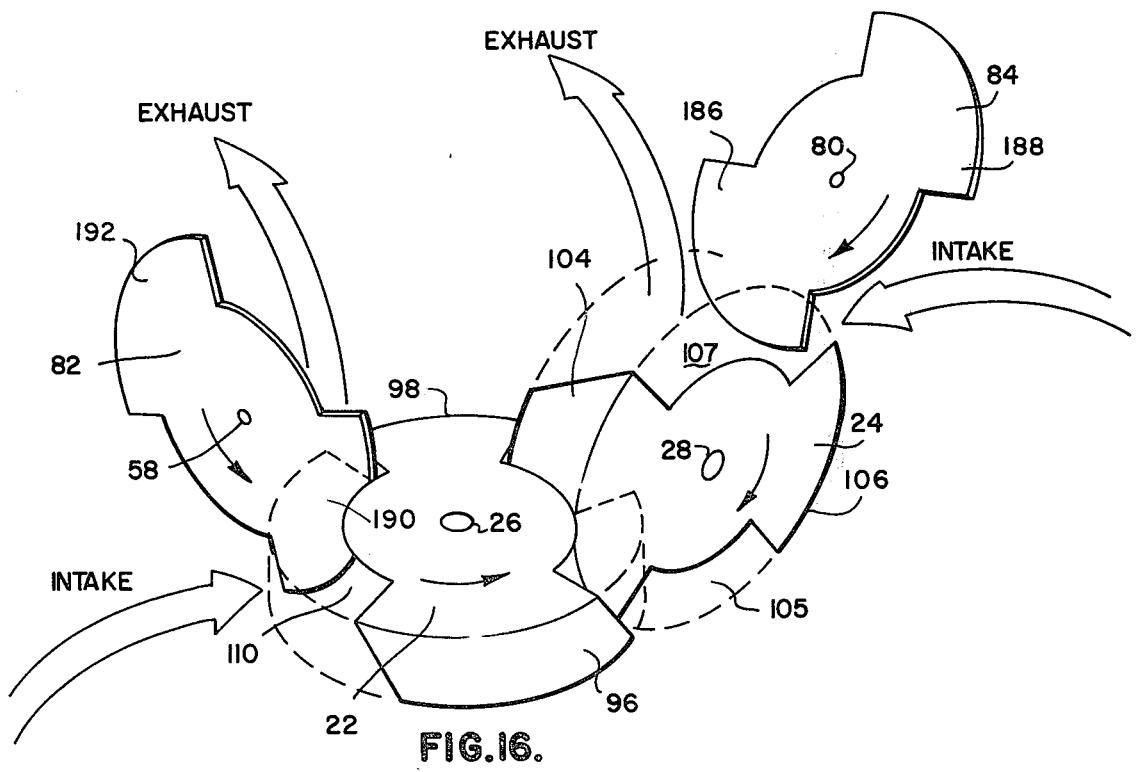
FIG. 16 is a diagrammatic view similar to FIG. 15 showing another stage in the operation of the four-cycle combustion engine species of the invention.

The abutment rotors 82 and 84 hereinbefore described are shown in FIGS. 15 and 16 and they are provided with a pair of lobes generally similar in shape to the lobes of the respective rotors 22 and 24 with which they cooperate. These abutment rotors 82 and 84 are relatively thin as shown in FIGS. 1 and 3 of the drawings so as to occupy a minimum amount of space in the respective recess chamber portions between the lobes of the respective rotors.

These abutment members 82 and 84 are shown diagrammatically in FIGS. 11, 12, 13, 14, 15 and 16 and the functions thereof will be apparent from the following description.

Figure 11:
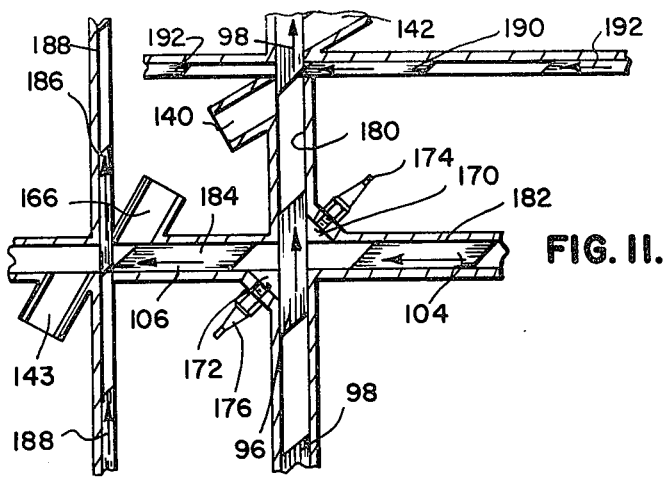
FIG. 11 is a diagrammatic sectional view showing the relative positions of the rotors and abutment members of the four-cycle combustion engine specie of the invention at the beginning of a power movement or stroke of one of the rotors of the engine.

Referring to FIG. 11, the functional elements of the foregoing machine are disclosed diagrammatically. At the beginning of a power stroke for the rotor 24 of the engine, it will be noted that the housing bore portions on the rotor passageways designated 180 and 182 intersect at right angles forming the power and compression chambers in conjunction with the rotors 22 and 24 of the engine. Spark plugs 176 and 174 are provided in the combustion chambers 172 and 170 respectively.

As shown in FIG. 11, the spark plug 176 has just fired and the fuel air mixture in the chamber 172 between the side wall of the lobe portion 96 of the rotor 22 and the trailing end of the lobe portion 106 of the rotor 24 effect a power stroke rotating the peripheral lobe portion 106 in the direction as indicated by the arrow 184. This causes the lobe portion 104 of the rotor 24 to compress the fuel air mixture in the chamber 170 between the opposite side of the lobe portion 96 of the rotor 22 and the leading surface of the lobe portion 104 of the rotor 24. The leading surface of the lobe portion 106 at this time has almost completed the exhausting of exhaust gases outward through the exhaust port 166 in conjunction with the peripheral portion 186 of the rotary abutment member 84.

Figure 12:
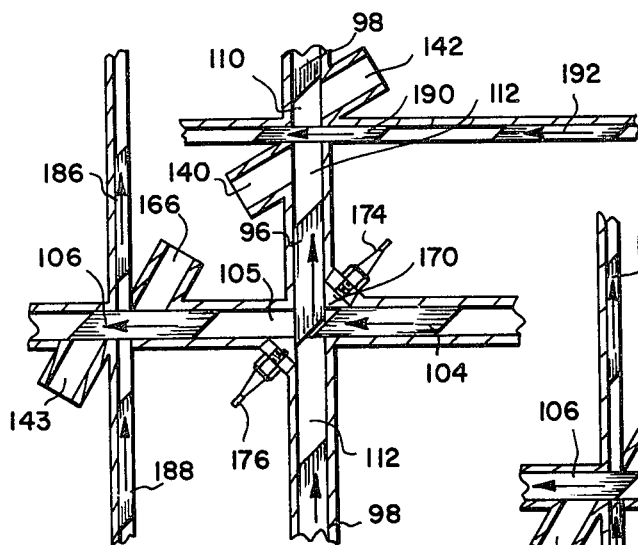
FIG. 12 is a diagrammatic sectional view similar to FIG. 11 showing the position of the rotors and abutment members at an intermediate stage of the power movement or stroke of one of the rotors.

In FIG. 12, the position of the parts are shown with the power stroke in the chamber 105 and the exhaust stroke in chamber 112 partially completed. The lobe portion 104 of the first rotor 24 has almost completed the compression stroke in chamber 170 ready for the spark plug 174 to fire. Intake of the fuel air mixture entering the chamber 110 takes place between the trailing end of the peripheral portion 98 of the rotor 22 and the side of the peripheral portion 190 of the rotating abutment 82. At this time, exhaust port 166 is closed by the lobe portion 106 of the rotor 24 while the exhaust port 140 and intake to the plenum 142 is open to the respective chamber.

Figure 13:
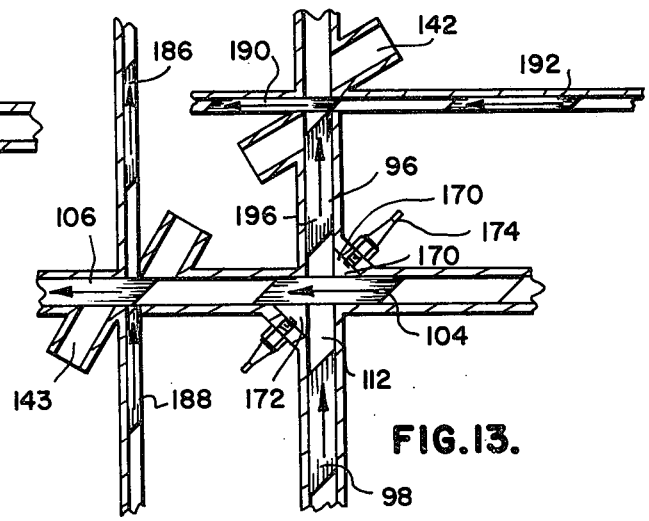
FIG. 13 is a diagrammatic sectional view similar to FIGS. 11 and 12 showing the rotors and abutment members in the position of an exhaust function relative to one of the rotors.

FIG. 13 discloses a situation just subsequent to operation of the spark plug 174 and firing of the charge in the chamber 170 thus driving the lobe portion 96 in the direction indicated by an arrow 196 for the rotor 22 causing its lobe portion 98 to compress the fuel charge which previously was induced through the plenum 142 and into the chamber 112.

Figure 14:
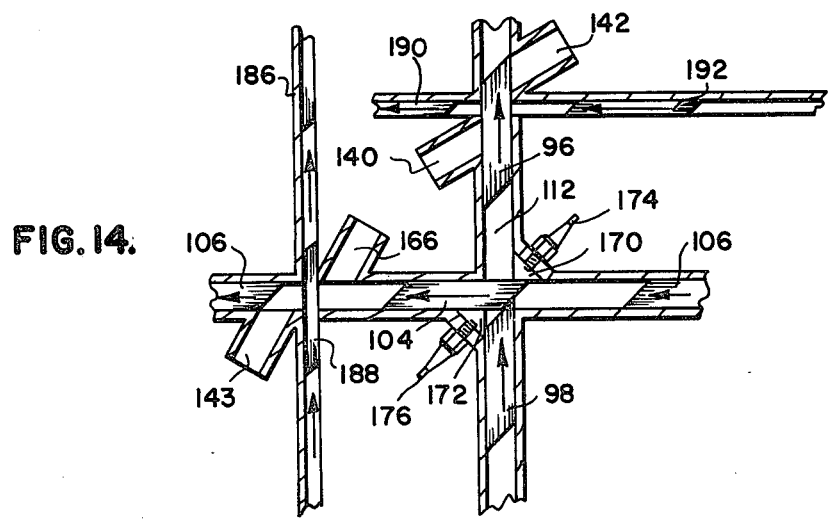
FIG. 14 is a diagrammatic sectional view similar to FIGS. 11, 12 and 13 and showing the rotors and abutment members at an intake position relative to one of the rotors.

As shown in FIG. 14, a further stage in the operation of the engine comprises the power stroke in the chamber 112 which is shown partially completed with the exhaust port 140 closed off and with the exhaust port 166 and intake plenum 143 in open position. The operation of the engine then returns to the cycle shown in FIG. 11. Accordingly, the foregoing description proceeds through the cycles of operation progressively through FIGS. 11, 12, 13 and 14 respectively.

Figure 10:
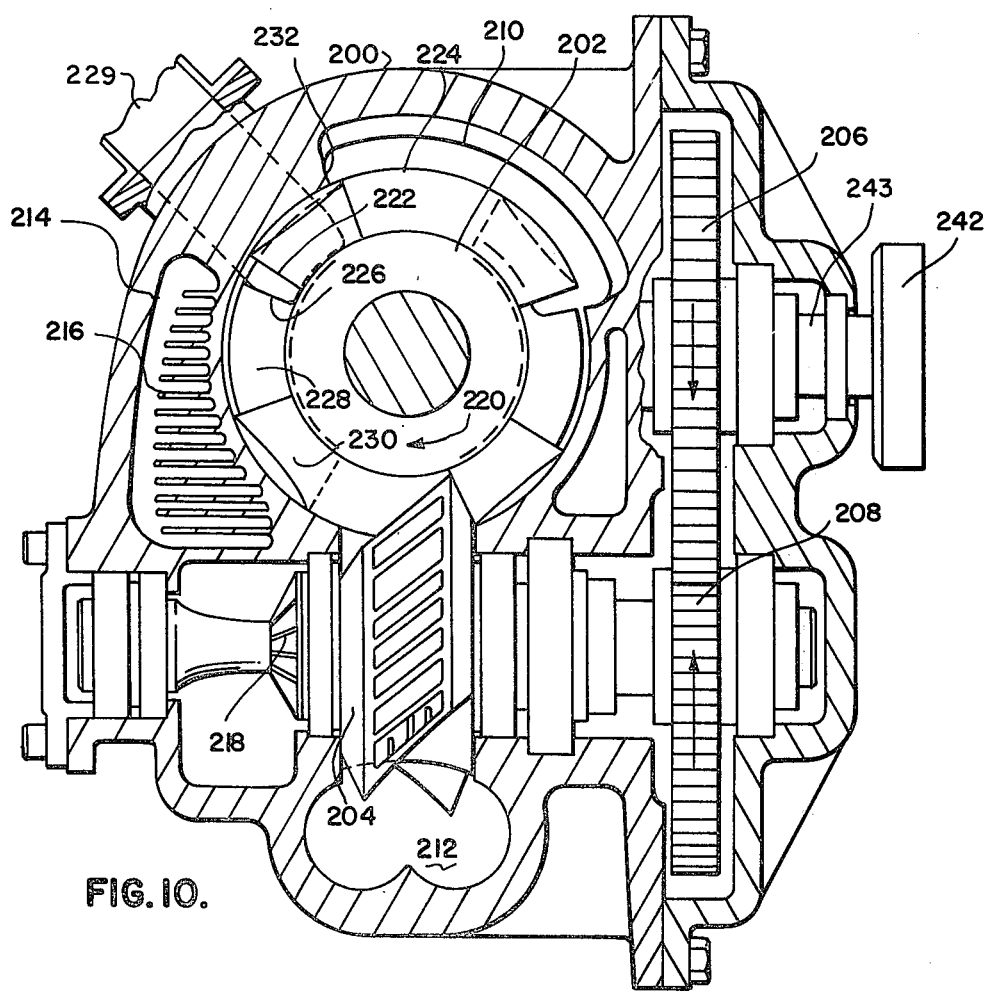
FIG. 10 is a sectional view similar to FIG. 1 but showing a two-cycle combustion engine specie of the invention.

As shown in FIG. 10, it will be obvious that a specie of the machine involves a two-cycle combustion engine arrangement wherein the hereinbefore described scavenging or rotating abutment members 82 and 84 are not utilized. Thus the mechanism of the two-cycle engine species shown in FIG. 10 is much simpler than that of the previously described four-cycle engine specie.

The two-cycle engine specie of the invention as shown in FIG. 10 of the drawings comprises a housing 200 having rotors 202 and 204 rotatably mounted therein. Spur gears 206 and 208 correspond to the gears 44 and 46 hereinbefore described and the rotor 202 is driven through miter gears such as the miter gears 30 and 32 hereinbefore described in connection with FIGS. 3 and 6 of the drawings.

Air receiving plenums 210 and 212 in the housing 200 are similar to the plenums 142 and 143 hereinbefoe described.

Each of the rotors 202 and 204 is provided with centrifugal compressor structure similar to that disclosed in FIGS. 7 and 8 of the drawings and also the two-cycle engine is provided with intake passage means 214 with heat exchange fins 216 therein communicating with an inlet eye 218, for example, of the rotor 24. The rotor 202 is likewise provided with similar intake means such as hereinbefore described in connection with the rotor 22.

Attention being directed to FIG. 10, it is pointed out that rotation of the rotor 202 in a direction of an arrow 220 in FIG. 10 of the drawings, will cause the trailing edge 222 of a lobe 224 of the rotor 202 to pass the edge 226 of an exhaust port which communicates with an exhaust pipe 229 which conducts products of exhaust to the atmosphere. This occurs near the end of the power stroke of the respective recess chamber 228 which is followed by the respective rotor lobe 230.

The remaining pressure inherent in the combustion gases cause the burned gases of combustion to flow from the cavity 228 through the exhaust port 226 and accomplish evacuation of the cavity 228 to be subsequently filled by fresh charge from the air receiving plenum 210 as rotation of the rotor 202 progresses to a position wherein the trailing edge 222 is exposed to the edge 232 of the air receiving plenum 210. In accordance with certain design considerations the inertia of the outflowing burned combustion gases through the port 226 would effectively evacuate the cavity 228 to a subambient pressure level and contamination of the incoming fresh charge would be minimal. Another variation is that the exhaust port 226 and the intake or air receiving plenum 210 are in close proximity as illustrated in FIG. 10, that rotation of the cavity 228 will cause the edge 222 of the cavity 228 to pass into the plenum 210 beyond its end 232 while the remaining portion of the cavity 228 is still exposed to the exhaust port 226. The result is that the charge present in the air receiving plenum 210, being at a substantially higher pressure level will displace burned gases out through the exhaust port 226 as the cavity 228 is filled with a fresh air or fuel air mixture. This is particularly applicable to engines using fuel injection wherein the fresh charge is composed only of air, although fuel air mixtures are also possible as is exemplified by the state of the art in two stroke cycle engines using fuel air mixtures.

The four-cycle engine specie of the invention is provided with a power output coupling 240 in connection with the shaft 34 and the two-cycle engine specie of the invention shown in FIG. 10 is provided with a power output coupling 242 in connection with the shaft 243 thereof which corresponds with the shaft 34 of the four-cycle engine specie shown in FIGS. 1 through 6 of the drawings.

Figure 17:
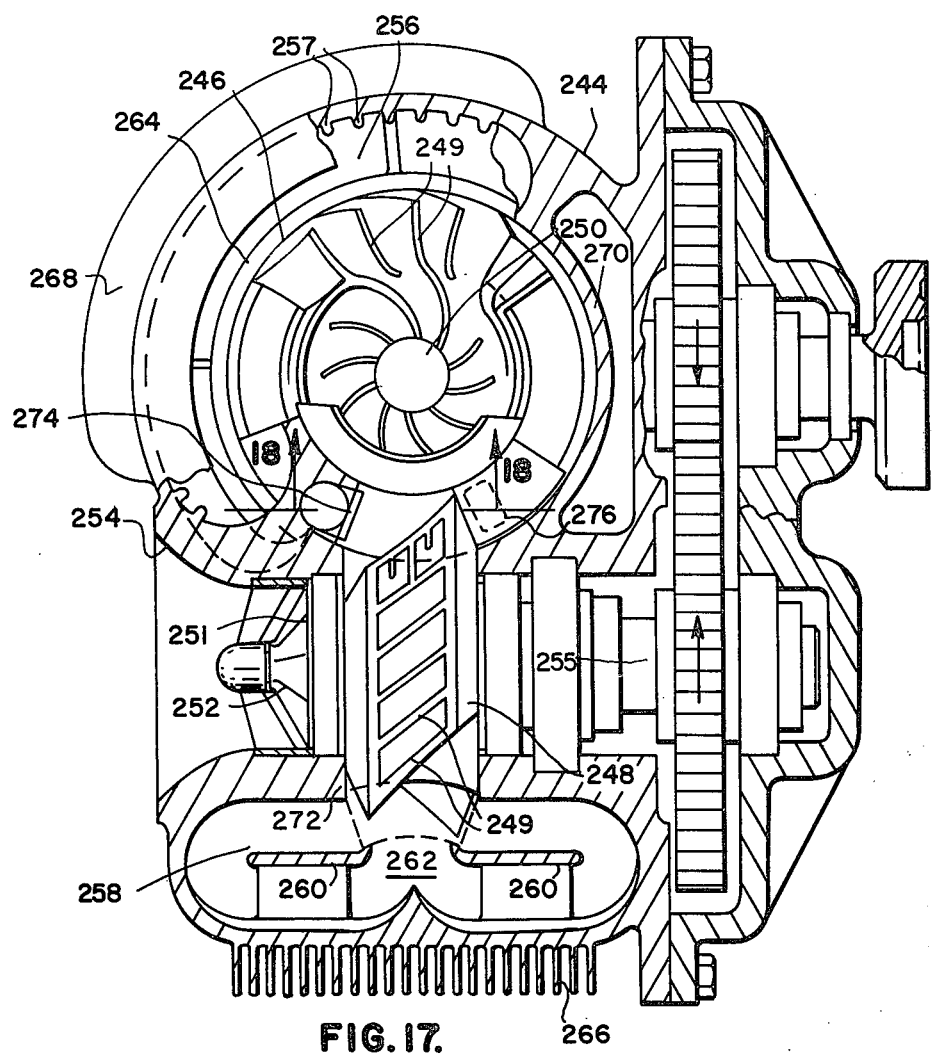
FIG. 17 is a sectional view similar to FIG. 1 but showing a two-stage compressor specie of the invention adapted for use as a high speed air compressor wherein air is centrifugally compressed in a first stage and then positively compressed in a second stage of operation.
Figure 18:
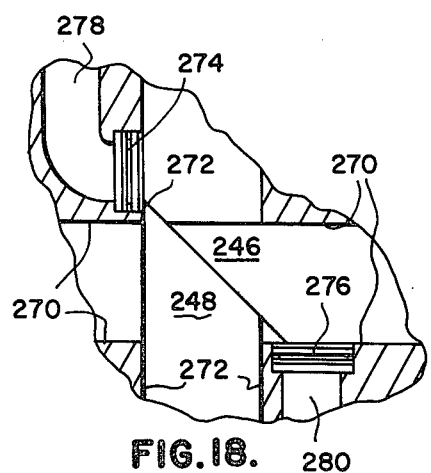
FIG. 18 is a diagrammatic fragmentary sectional view taken from the line 18—18 of FIG. 17.

FIGS. 17 and 18 illustrate a compressor specie of the invention which comprises a housing 244 having a pair of rotors 246 and 248 therein. These rotors 246 and 248 are similar to the rotors 22 and 24, both having similar centrifugal compressor structures including fins therein; the maximum heat exchange surface being towards a trailing area of the cavity in the ones of higher temperature, rather than in the forward portion of the cavity as in the case of engine configurations.

The compressor specie, as shown in FIG. 17, may comprise somewhat different compressor blading or vanes such as shown in FIG. 17, wherein the blades and vanes 249 extend from the central shaft 250. The structure of the compressor rotor 248 being similar and provided with an inlet eye 251 with which the blades 249 communicate. These blades 249 are provided with portions 252 which extend into close proximity to the shaft 255 and a bell mouth intake opening 254 in the housing 244 conducts air to the inlet eye 251 of the rotor 248 and likewise a similar bell mouth inlet is provided for the inlet of the rotor 246.

As shown in FIG. 17 of the drawings, the blades 249 are adapted centrifugally to compress air into a plenum 256 disposed radially outward from the compressor rotor 246 and into a plenum 258 disposed radially outward from the periphery of the compressor rotor 248.

Both of these plenums are similar and substantially arcuate baffles 260 are spaced apart from a median portion 262 aligned with the periphery of the compressor rotor 248 and likewise baffles 264 similar to the baffles 260 are disposed in the plenum 256.

Externally of the plenum 258 are heat exchange fins 266 adapted to exchange heat to the atmosphere and likewise heat exchange fins 268 of the housing 244 extend outwardly and are adapted to exchange heat from air compressed in the plenum 256.

The housing is provided with a passage 270 in which the rotor 246 rotates and another passage 272 in which the intersecting rotor 248 traverses.

At the junctures of the passages 270 and 272, a pair of one way check valves 274 and 276 are disposed to receive compressed air and to deliver the compressed air through outlets 278 and 280 respectively in a housing 244.

As shown in FIG. 18, rotor 246 is moving in a direction toward the left and rotor 248 is moving in a direction downwardly causing air to be compressed into and through the check valve 276 and outward through the outlet passage 280. A subsequent partial cycle causes the same situation to occur at the intersection of the passages 270 and 272 for compressing and forcing compressed air through the check valve 274.

It will, therefore, be understood that compressor intake is through the hub area of each rotor and the air flow is radially outward as the result of suitable compressor centrifugal vane configurations and the centrifugal effects of the rotor rotation. The vanes or blades serve not only to accelerate the air or gas but as heat transfer surfaces to cool the respective rotors from the heat of compression generated by the following second stage positive compression as will be hereinafter described. In addition, the blades and fins or ribs in the centrifugal compressors would be of such configuration as to provide additional heat transfer surfaces to afford rotor cooling required to the various temperature levels of the rotor. In the following second stage positive displacement cycle where lobes of the rotors 246 and 248 compress gas or air through the check valves 274 and 276 the trailing face of the rotor cavity and the cavity of the other area adjacent to that face are exposed to the highest temperatures as a result of the second stage positive displacement compression.

Analytically, proper distribution of heat transfer areas and air flow will serve to balance the temperatures of the rotors as a whole to the mechanical advantage of the machine.

The first stage centrifugal compression is followed by second stage positive displacement compression. If it is elected to provide intercooling between the first stage discharge and the second stage intake functions, the volumetric efficiency of the machine is increased and, accordingly, the intercooling is easily achieved by utilizing the first stage discharge plenum such as the plenum 256 as a heat rejection surface with the help of fins and ribs to provide heat transfer surfaces. The plenum 256, for example, being provided with internal ribs 257 which conduct heat to the wall of the housing and to the fins 268.

The second stage compression by the lobes of the rotors 246 and 248 is accomplished in a similar manner to that hereinbefore described in the operation of the lobes of the two-cycle and four-cycle engine in compressing a fuel charge preliminary to ignition. Thus the second stage compression operation of the compressor is a positive displacement with its discharge pressure capability not limited to speed of rotation in the sense of first stage centrifugal compression. Both centrifugal and positive displacement compressors operating by themselves have limitations and advantages relating to the speed of the machine. In the case of centrifugal compressors the volume of flow through the machine will vary to increase as the explanential value of the speed but the discharge pressure is limited and related to the speed and diameter. In the case of positive displacement machines, the volume of flow or volumetric efficiency decreases with increased speed due to flow inertias but the discharge pressure capability is not proportional to speed at all, rather is a matter of leakages and the extent to which unswept volumes can be minimized.

This concept, according to the present invention, in which first stage compression is centrifugal and the second stage or following stage is positive displacement is made possible by the unique geometry of the invention which utilizes and combines the better capabilities of both principles in one simple and practical configuration. Sequentially then, intake occurs through the hub of each rotor and the centrifugal compressor therein causes air flow to pass centrifugally through the rotors which cools the rotors and the fluid is centrifugally compressed. The flow may then be intercooled as by use of the fins 257 and 268 to improve volumetric efficiency of the following compression stage. Then the second stage compression occurs as the cavities between the lobes of the rotors 246 and 248 pass the respective plenums such as the plenum 256 wherein centrifugal compression has raised the pressure of the fluid to a level above atmospheric. As the rotor chamber between the lobes then progresses to a position such as shown in FIG. 18, the positive compression takes place between the related lobes of the two rotors in a manner as hereinbefore described in connection with the four-cycle internal combustion engine preliminary to ignition and, as shown diagrammatically in FIGS. 11 to 14 inclusive. Following the positive displacement compression, further intercooling may follow to attain desired conditions at a final pressure level of the fluid. In addition, there may be applications where two stage compression may not be desired but rotor cooling may still be required and, in this case, the rotor cooling flow could discharge outside the compressor flow cycle and compression of the cycle flow would be positive displacement only in as many stages as required. Accordingly, it will be appreciated that several stages of positive compression may be accomplished in a manner comparable to that hereinbefore described in connection with the positive displacement of the gases by interaction of the related rotor lobes.

It will be obvious to those skilled in the art that various modifications may be restored to without departing from the spirit of the invention in the various applications.

We claim:

1. In a rotary machine the combination of: a plurality of cooperating rotors; each rotor having a peripheral portion provided with a plurality of notch like chamber recess portions disposed radially inward from the respective peripheral portions; each rotor having radially projecting lobe portions disposed between respective chamber recess portions; said rotors having respective axes of rotation; means rotatably mounting said rotors such that their axes of rotation are at an angle to each other and such that said projecting lobe portions of each rotor pass through respective chamber recess portions of the other of said rotors; means for synchronizing rotary motion of said rotors; centrifugal compressor blade means internally of said rotors; said rotors each having an air compressor inlet means near its respective axis of rotation; each of said rotors having an air compressor outlet at the peripheral extremities of said projecting lobe portions; a housing for said rotors; said housing having a compressed air receiving plenum adjacent to and communicating with said peripheral portions of each of said rotors and adapted to supercharge each of said chamber recess portions as it passes in communication with said respective plenum.

2. The invention as defined in claim 1, wherein: rotary abutment members are rotatably mounted in said housing; means for rotatably synchronizing rotation of said abutments with rotation of said rotors; said rotatable abutments having respective peripheral portions provided with notch portions and lobe portions comparable in shape to the recess chamber portions and lobe portions of said rotor; said abutment portions being substantially thin as compared to said rotors and such that the thickness of each lobe portion being only a fraction of the arcuate length of the respective recess chamber portions; the abutment portions being rotatable into said respective chamber portions in timed relation with the rotation of said rotors; said housing provided with exhaust outlet openings; said abutment portions adapted to rotate in an area between said exhaust outlet openings and said air receiving plenums so as to provide an abutment to direct exhaust gas outwardly through the exhaust gas opening as the respective chamber portion passes toward the respective air receiving plenum; said housing provided with combustion chamber means disposed at areas of intersection of said rotors; ignition means in said combustion chambers; said centrifugal compressor blade means internally of said rotors providing for cooling of said rotors and for regenerative heat exchange to air compressed into said air receiving plenums; said housing having an air inlet passage means communicating with the compressor inlet of each of said rotors; each respective air inlet passage means having heat exchange fins in conductive relationship with said housing and adapted to conduct heat to air entering said compressor inlet of each respective rotor whereby heat of combustion conducted to said housing is exchanged to air entering said compressor air inlets for recuperative or regenerative heat exchange capable of increasing the efficiency of thermodynamic operation of said machine.

3. The invention as defined in claim 1, wherein: a compressor outlet check valve means is disposed in said housing at an intersecting area of said rotors; said housing having a compressed air outlet extending from said check valve and said check valve allowing flow in only one direction from said valve through said outlet; said machine having a pair of said check valves disposed generally diagonally relative to the intersection area of said rotors in said housing.

4. The invention as defined in claim 1, wherein: combustion chamber means is disposed in said housing adjacent an intersection area of said rotors so as to communicate with said recess chamber portions as they rotate in said housing; said housing having a pair of said combustion chamber portions provided with ignition means therein; said machine being adapted to operate as a two-cycle rotary combustion engine; an exhaust outlet in said housing adjacent to each respective air receiving plenum whereby exhaust gases carried in respective recess chamber portions exhaust through respective exhaust outlet openings as the respective recess chamber portion approaches the respective air receiving plenum; said air receiving plenum being spaced from said exhaust outlet opening a distance less than the respective arcuate length of the recess chamber from which exhaust gas is being exhausted through said outlet opening whereby a portion of compressed air in said respective plenum displaces said exhaust gas in said respective recess chamber portions thereby scavenging the said chamber portion so as to replace burned exhaust gases with an unburned charge from the respective air receiving plenums.

5. The invention as defined in claim 2, wherein: said fins in said respective air inlet passages of said housing and said centrifugal compressor blades in said rotors function in series to exchange heat from the housing and rotors respective to elevate the temperature of air at the intake of each air receiving plenum so that said air carries substantial thermal energy as it is centrifugally compressed into the respective air receiving plenums in said housing.

6. The invention as defined in claim 3, wherein: said housing in said respective air receiving plenums is provided with means for heat exchange therefrom to outside atmosphere for cooling air received in said air receiving plenums preliminary to the charging of air into said recess chamber means and positive compression at the intersection of said rotors preliminary to the passage of said air outwardly through said check valves and to a use location.

7. The invention as defined in claim 1, wherein: said housing is provided with air inlet passages having heat exchange fins therein; said inlet passages communicating with respective air compressor inlet means of said rotors.

8. The invention as defined in claim 4, wherein: ambient air inlet means is provided in said housing and communicates directly with respective compressor air inlet means of said rotors.

9. The invention as defined in claim 1, wherein: said centrifugal compressor blade means internally of said rotors provides supercharging compressed air in said plenums for supercharging said recess chamber portions whereupon said chamber portions are charged with air under compression and whereupon the air in said recess chamber portions becomes positively compressed at an intersection area of said rotors; each respective lobe of each rotor at said intersecting area rotatably passing through a respective recess chamber portion of the other rotor such as to sweep the chamber area between the lobes of the respective rotor and thereby force the compressed air out of said chamber and into an area at the intersection proximities of said rotors.

10. The invention as defined in claim 1, wherein: said lobe portions of said rotors are provided with opposed leading and trailing surfaces; said surfaces being disposed in substantially radial directions and thus forming substantially radially disposed walls of said recess portions.

11. The invention as defined in claim 10, wherein: each of said leading and trailing surfaces being disposed at a substantially helical angle to the respective axis of rotation of the respective rotor; and said leading and trailing surfaces of each lobe being substantially parallel with each other.

12. A rotor having a peripheral portion provided with a plurality of notch like chamber recess portions disposed radially inward from the respective peripheral portion; said rotor having radially projecting lobe portions disposed between respective chamber recess portions; said rotor having an axis of rotation; centrifugal compressor blade means internally of said rotor; said rotor having an air compressor inlet means near its respective axis of rotation; said rotor having an air compressor outlet at the peripheral extremities of each of said projecting lobe portions; said lobe portions having opposed leading and trailing surfaces; said surfaces being disposed in substantially radial direction and thus forming substantially radially disposed walls of respective recess chamber portions of said rotor; each of said leading and trailing surfaces being disposed at a substantially helical angle to the respective axis of rotation of the respective rotor; said leading and trailing surface of each lobe being substantially parallel with each other.

13. The invention as defined in claim 4, wherein: the arcuate length of said plenum portions substantially equal or correspond to the arcuate length of the respective lobe portions of said rotors.

14. The invention as defined in claim 1, wherein: means is provided in said housing for receiving compressed air at the intersections of said rotors.

15. The invention as defined in claim 1, wherein: combustion chamber means is disposed in said housing adjacent an intersection area of said rotors so as to communicate with said recess chamber portions as they rotate in said housing; said housing having a pair of said combustion chamber portions provided with ignition means therein; said centrifugal compressor blade means internally of said rotors providing for cooling of said rotors and for regenerative heat exchange to air compressed into said air receiving plenums; said housing having an air inlet passage means communicating with the compressor inlet of each of said rotors; each respective air inlet passage means having heat exchange fins in conductive relationship with said housing and adapted to conduct heat to air entering said compressor inlet of each respective rotor whereby heat of combustion conducted to said housing is exchanged to air entering said compressor air inlets for recuperative or regenerative heat exchange capable of increasing the efficiency of thermodynamic operation of said machine; said machine being adapted to operate as a two-cycle rotary combustion engine; an exhaust outlet in said housing adjacent to each respective air receiving plenum whereby gases carried in respective recess chamber portions exhaust through respective exhaust outlet openings as the respective recess chamber portion approaches the respective air receiving plenum.

16. The invention as defined in claim 2, wherein: ambient air inlet means is provided in said housing and communicates directly with respective compressor air inlet means of said rotors.

* * * * *